United States Patent
Furusawa et al.

(10) Patent No.: US 11,400,578 B2
(45) Date of Patent: Aug. 2, 2022

(54) WORK TOOL

(71) Applicant: MAKITA CORPORATION, Anjo (JP)

(72) Inventors: Masanori Furusawa, Anjo (JP); Akira Mizutani, Anjo (JP)

(73) Assignee: MAKITA CORPORATION, Anjo (JP)

(*) Notice: Subject to any disclaimer, the term of this patent is extended or adjusted under 35 U.S.C. 154(b) by 252 days.

(21) Appl. No.: 16/842,844

(22) Filed: Apr. 8, 2020

(65) Prior Publication Data
US 2020/0316767 A1  Oct. 8, 2020

(30) Foreign Application Priority Data

Apr. 8, 2019  (JP) ............................. JP2019-073761

(51) Int. Cl.
| | |
|---|---|
| *B25F 5/02* | (2006.01) |
| *B24B 47/10* | (2006.01) |
| *B25F 5/00* | (2006.01) |
| *B23D 61/00* | (2006.01) |
| *B25F 3/00* | (2006.01) |

(52) U.S. Cl.
CPC ................ *B25F 5/02* (2013.01); *B24B 47/10* (2013.01); *B23D 61/006* (2013.01); *B25F 3/00* (2013.01); *B25F 5/006* (2013.01)

(58) Field of Classification Search
CPC .... B25F 5/02; B25F 3/00; B25F 5/006; B24B 47/10; B23D 61/006
See application file for complete search history.

(56) References Cited

U.S. PATENT DOCUMENTS

| 4,980,994 A * | 1/1991 | Helm ..................... G01B 3/205 |
|---|---|---|
| | | 451/342 |
| 5,175,963 A * | 1/1993 | Schafer ................. B24B 45/006 |
| | | 451/342 |
| 5,489,285 A * | 2/1996 | Goris ..................... B23D 51/10 |
| | | D24/146 |
| 6,796,888 B2 * | 9/2004 | Jasch ................... B23D 61/025 |
| | | 451/511 |
| 6,887,142 B2 * | 5/2005 | Rupprecht ............ F16D 1/0805 |
| | | 451/508 |

(Continued)

FOREIGN PATENT DOCUMENTS

JP         2016-529118 A      9/2016

*Primary Examiner* — Nathaniel C Chukwurah
*Assistant Examiner* — Lucas E. A. Palmer
(74) *Attorney, Agent, or Firm* — Oliff PLC

(57) ABSTRACT

A work tool includes a spindle, a clamp shaft and at least one biasing part. The spindle is configured to be reciprocally rotated within a specified angle range around a driving axis. The spindle has a first inclined face inclined in a direction crossing the driving axis. The clamp shaft includes a shaft part and a head part. The shaft part is configured to be coaxially inserted into the spindle. The head part is formed on a lower end portion of the shaft part and configured to clamp the tool accessory in cooperation with the spindle while a second inclined face of the tool accessory is pressed against the first inclined face. The at least one biasing part is provided in the spindle and configured to always bias the tool accessory downward while the tool accessory is clamped by the head part and the spindle.

20 Claims, 18 Drawing Sheets

(56) References Cited

U.S. PATENT DOCUMENTS

| | | | | |
|---|---|---|---|---|
| 8,182,316 | B2* | 5/2012 | Peisert | B24B 45/006 30/388 |
| 9,339,927 | B2* | 5/2016 | Xu | B27B 5/30 |
| 10,906,153 | B2* | 2/2021 | Aoki | B25F 3/00 |
| 11,173,592 | B2* | 11/2021 | Furusawa | B27B 5/32 |
| 2003/0114092 | A1* | 6/2003 | Rupprecht | B24B 45/006 451/508 |
| 2003/0190877 | A1* | 10/2003 | Gallagher | B24B 55/00 451/344 |
| 2007/0060030 | A1* | 3/2007 | Pollak | B27B 5/32 451/359 |
| 2013/0082449 | A1* | 4/2013 | Bernardi | B24B 23/022 279/141 |
| 2013/0193655 | A1* | 8/2013 | Kaye, Jr. | B23B 31/10 279/141 |
| 2014/0144662 | A1* | 5/2014 | Zhou | B27B 5/32 279/141 |
| 2015/0042052 | A1* | 2/2015 | Furusawa | B24B 23/04 279/141 |
| 2015/0075830 | A1* | 3/2015 | Zhang | B24B 23/022 173/213 |
| 2016/0184956 | A1* | 6/2016 | Klabunde | B24B 23/022 279/4.01 |
| 2016/0199919 | A1* | 7/2016 | Klabunde | B23B 31/008 279/141 |
| 2016/0288288 | A1* | 10/2016 | Klabunde | B23D 61/006 |
| 2017/0050292 | A1* | 2/2017 | Aoki | B24B 23/022 |
| 2017/0282329 | A1* | 10/2017 | Bernardi | B27B 5/32 |
| 2019/0120347 | A1* | 4/2019 | Bek | F16H 25/16 |
| 2020/0282539 | A1* | 9/2020 | Ikuta | B25F 5/02 |
| 2020/0316767 | A1* | 10/2020 | Furusawa | B24B 47/10 |
| 2021/0086276 | A1* | 3/2021 | Ling | B25F 5/00 |

\* cited by examiner

WORK TOOL

CROSS-REFERENCE TO RELATED APPLICATION

The present application claims priority to Japanese patent application No. 2019-73761 filed on Apr. 8, 2019, contents of which are fully incorporated herein by reference.

TECHNICAL FIELD

The present disclosure relates to a work tool which is configured to perform a processing operation on a workpiece by driving a tool accessory in an oscillating manner.

BACKGROUND ART

A work tool (a so-called oscillating tool) is known which is configured to perform a processing operation on a workpiece by oscillatorily driving a tool accessory, which is mounted to a spindle, within a specified angle range. In such an oscillating tool, it is known that contact areas of the spindle and the tool accessory are each formed into an inclined face extending in a direction crossing a rotation axis of the spindle, for the purpose of easily absorbing torque applied to the tool accessory (see, Japanese Unexamined Patent Application Publication (Translation of PCT Application) No. 2016-529118, for example).

SUMMARY

The present disclosure provides a work tool which is configured to perform a processing operation on a workpiece by driving a tool accessory in an oscillating manner. The work tool includes a spindle, a clamp shaft and at least one biasing part. The spindle is configured to be reciprocally rotated within a specified angle range around a driving axis. The driving axis defines an up-down direction of the work tool. Further, the spindle has a first inclined face. The first inclined face is formed on a lower end portion of the spindle, and inclined in a direction crossing the driving axis. The clamp shaft includes a shaft part and a head part. The shaft part is configured to be coaxially inserted into the spindle. The head part is formed on a lower end portion of the shaft part. Further, the head part is configured to clamp the tool accessory in cooperation with the spindle while a second inclined face of the tool accessory is pressed against the first inclined face of the spindle. The at least one biasing part is provided in the spindle. The at least one biasing part is configured to always bias the tool accessory downward, while the tool accessory is clamped by the head part and the spindle. It is noted that the at least one biasing part may directly bias the tool accessory in abutment with the tool accessory, or indirectly bias the tool accessory via a separate member.

DETAILED DESCRIPTION OF THE EMBODIMENTS

Figure 1:
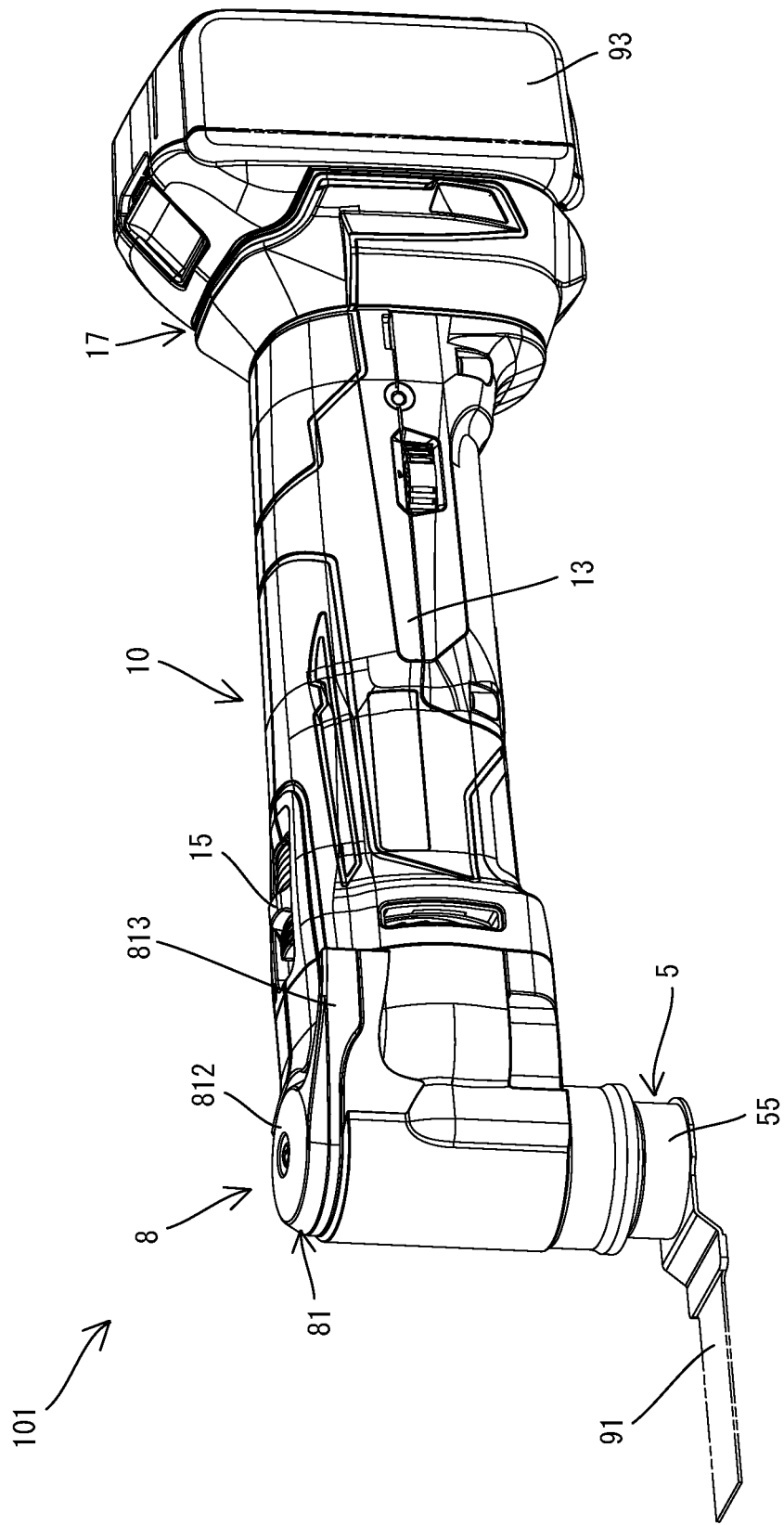
FIG. 1 is a perspective view showing a whole oscillating tool.

Embodiments are now described with reference to the drawings.

First Embodiment

A first embodiment is described with reference to FIGS. 1 to 13. In the present embodiment, an electric oscillating tool 101 is described as an example of a work tool which is configured to perform a processing operation on a workpiece (not shown) by driving a tool accessory 91 (see FIG. 1) in an oscillating manner. Plural kinds of tool accessories such as a blade, a scraper, a grinding pad and a polishing pad are available, as the tool accessory 91 which can be mounted to the oscillating tool 101. In order to perform a desired processing operation, a user may select one of the tool accessories 91 which is suitable for the desired processing operation such as cutting, scraping, grinding and polishing, and mount the tool accessory 91 to the oscillating tool 101. In the drawings to be referenced below, a blade mounted to the oscillating tool 101 is shown as an example of the tool accessory 91.

Figure 2:
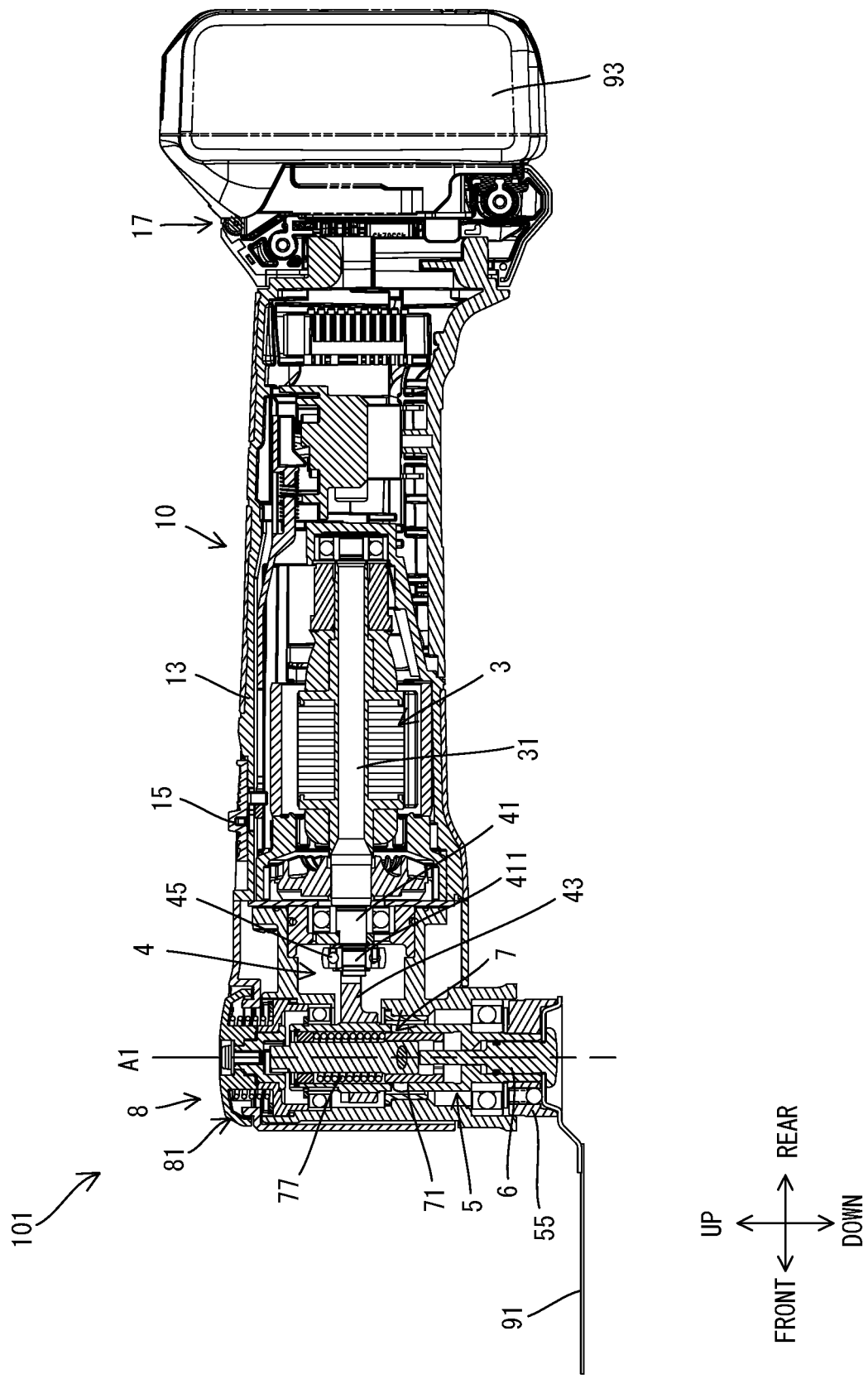
FIG. 2 is a sectional view showing the oscillating tool when a holding shaft is in a clamp position.

First, the general structure of the oscillating tool 101 is described. As shown in FIGS. 1 and 2, the oscillating tool 101 has an elongate housing (also referred to as a tool body) 10. A spindle 5, a motor 3 and a driving mechanism 4 are housed within the housing 10. The spindle 5 is housed in one end portion in a longitudinal direction of the housing 10. Further, the spindle 5 is arranged along a driving axis A1, which crosses (specifically, which orthogonally crosses) a longitudinal axis of the housing 10. One end portion of the spindle 5 in its axial direction protrudes from the housing 10 and is exposed to the outside. The tool accessory 91 can be removably mounted to this exposed portion. Further, a battery 93 for supplying electric power to the motor 3 can be removably mounted to the other end portion of the housing 10 in the longitudinal direction. The spindle 5 is configured to be reciprocally rotated within a specified angle range around the driving axis A1 by power of the motor 3 which is transmitted via the driving mechanism 4. Thus, the tool accessory 91 mounted to the spindle 5 is oscillated within the specified angle range, so that a processing operation is performed on a workpiece.

In the following description, for convenience sake, relating to directions of the oscillating tool 101, an extending direction of the driving axis A1 (also referred to as a driving-axis direction) is defined as an up-down direction. In the up-down direction, the side of one end portion of the spindle 5 to which the tool accessory 91 may be mounted is defined as a lower side, while the opposite side is defined as an upper side. A direction which is orthogonal to the driving axis A1 and which corresponds to the longitudinal direction of the housing 10 is defined as a front-rear direction. In the front-rear direction, the side of one end portion of the housing 10 in which the spindle 5 is housed is defined as a front side, while the side of the other end portion on which the battery 93 may be mounted is defined as a rear side. Further, a direction which is orthogonal to the driving axis A1 and also to the longitudinal axis of the housing 10 is defined as a left-right direction.

The detailed structure of the oscillating tool 101 is now described.

First, the housing 10 is described. As shown in FIGS. 1 and 2, the housing 10 is an elongate housing which forms an outer shell of the oscillating tool 101. The spindle 5 is housed in a front end portion of the housing 10. The motor 3 is housed in a generally central portion of the housing 10. The driving mechanism 4 is disposed between the motor 3 and the spindle 5 in the housing 10. The central portion of the housing 10 forms a grip part 13 to be held by a user. A slide switch 15 is arranged on a top of the housing 10. The slide switch 15 is configured to be operated by a user while holding the grip part 13. In the present embodiment, when the slide switch 15 is switched to an ON position, the motor 3 is driven. A battery-mounting part 17, to which the rechargeable battery 93 may be removable mounted, is provided on a rear end portion of the housing 10. The structures of the battery 93 and the battery-mounting part 17 are well known and therefore not described here.

The motor 3, the driving mechanism 4, the spindle 5 and other internal mechanisms are now described.

As shown in FIG. 2, the motor 3 is arranged such that a rotation axis of a motor shaft 31 is orthogonal to the driving axis A1 of the spindle 5. Specifically, the rotation axis of the motor shaft 31 extends in the front-rear direction along the longitudinal axis of the housing 10.

The driving mechanism 4 is configured to reciprocally rotate the spindle 5 within a specified angle range around the driving axis A1 by power of the motor 3. As shown in FIG. 2, the driving mechanism 4 of the present embodiment includes an eccentric shaft 41, an oscillating arm 43 and a drive bearing 45. The driving mechanism 4 having such a structure is well known and therefore briefly described here. The eccentric shaft 41 is connected to the motor shaft 31 and has an eccentric part 411 which is eccentric to the rotation axis of the motor shaft 31. The drive bearing 45 is fitted onto an outer periphery of the eccentric part 411. The oscillating arm 43 connects the drive bearing 45 and the spindle 5. One end portion of the oscillating arm 43 has an annular shape and is fixed onto an outer periphery of the spindle 5, while the other end portion of the oscillating arm 43 has a bifurcated shape and is arranged to abut on an outer periphery of the drive bearing 45 from the left and right.

Figure 3:
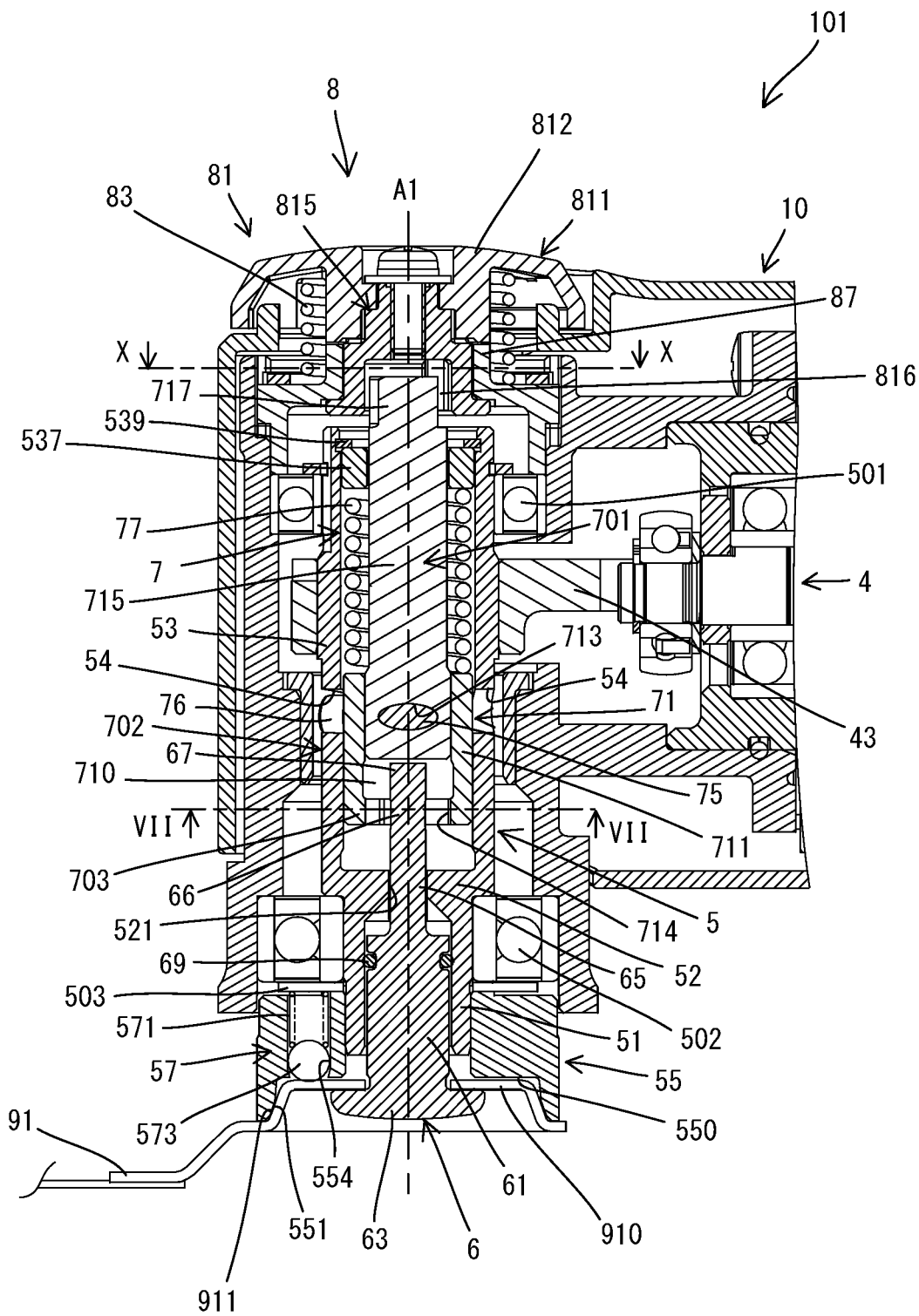
FIG. 3 is a partial, enlarged view of FIG. 2.

As shown in FIG. 3, the spindle 5 is a hollow circular cylindrical member extending in the up-down direction. A clamp shaft 6 (specifically, a shaft part 61) can be inserted into the spindle 5 through an open lower end of the spindle 5. The spindle 5 is supported within the front end portion of the housing 10 so as to be rotatable around the driving axis A1. More specifically, upper and lower end portions of the spindle 5 are respectively supported by two bearings 501 and 502 which are fixed to the housing 10. The one end portion of the oscillating arm 43 which is described above is fixed onto the outer periphery of the spindle 5 between the bearings 501 and 502. The lower end portion (below the bearing 502) of the spindle 5 is exposed to the outside from the housing 10.

Figure 4:
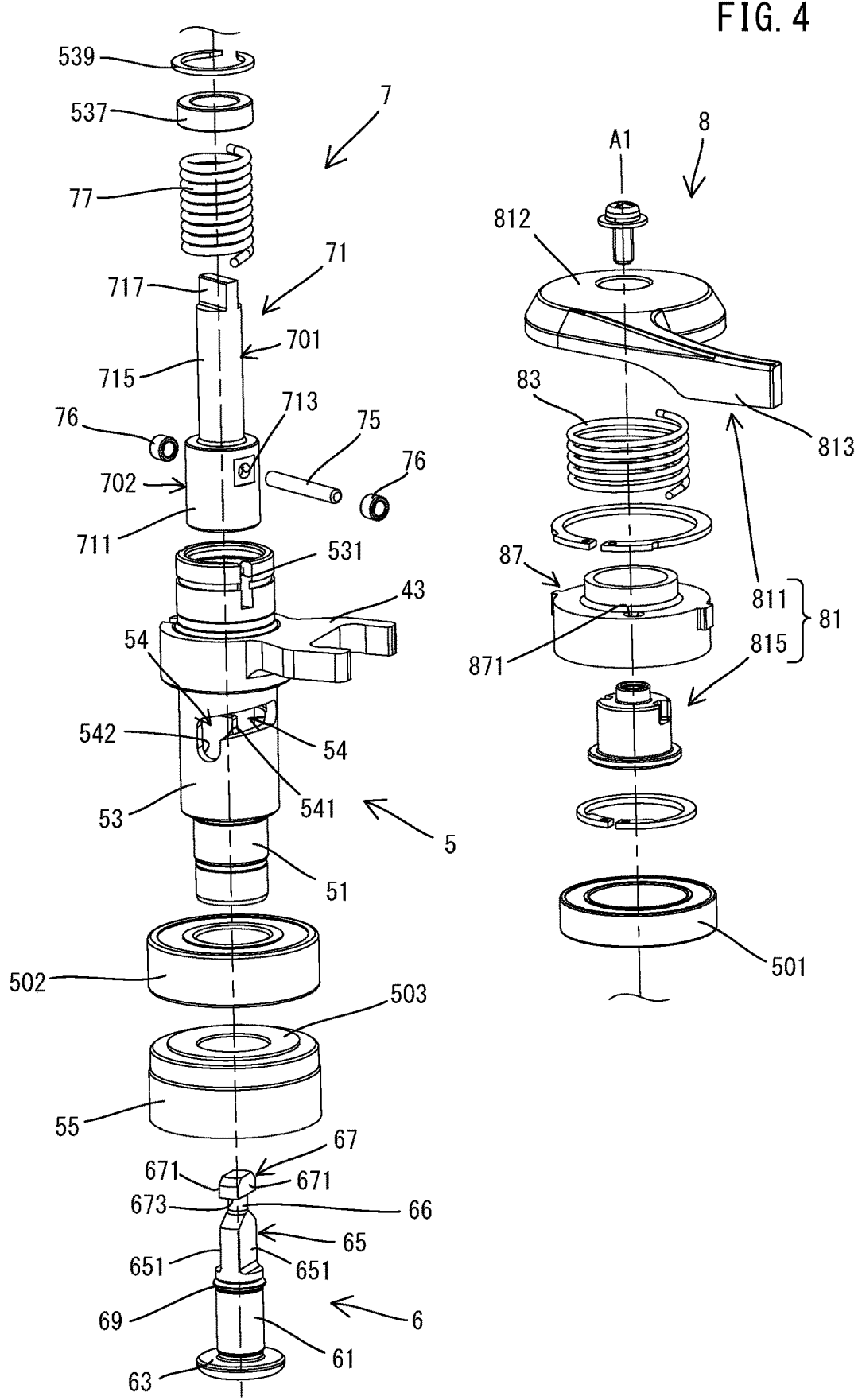
FIG. 4 is an exploded perspective view showing a clamp shaft, a spindle, a holding mechanism and a releasing mechanism.

As shown in FIGS. 3 and 4, the spindle 5 includes a small-diameter part 51, a large-diameter part 53 and a tool-mounting part 55.

The small-diameter part 51 is a portion into which the shaft part 61 of the clamp shaft 6 may be inserted, and has an inner diameter which is slightly larger than the diameter of the shaft part 61. The large-diameter part 53 extends upward from an upper end of the small-diameter part 51, and has a larger inner diameter than that of the small-diameter part 51. The large-diameter part 53 has a pair of pin-engagement grooves 54. The pin-engagement grooves 54 are through holes extending radially through the spindle 5 and have rotational symmetry of 180 degrees (i.e. rotational symmetry of order 2) relative to the driving axis A1. Each of the pin-engagement grooves 54 includes a first part 541 and a second part 542. The first part 541 extends obliquely relative to the driving axis A1 and to an imaginary plane which is orthogonal to the driving axis A1. The second part 542 extends in the driving-axis direction (in the up-down direction). In the present embodiment, an inclination angle of the first part 541 relative to the imaginary plane which is orthogonal to the driving axis A1 is set to about 7 to 10 degrees. Both end portions (specifically, rollers 76) of an engagement pin 75 are respectively engaged with the pin-engagement grooves 54.

The tool-mounting part 55 is a flange-like portion protruding radially outward from a lower end portion of the small-diameter part 51. The tool-mounting part 55 is disposed below the bearing 502, with a washer 503 interposed therebetween, and press-fitted onto an outer periphery of the small-diameter part 51. The tool accessory 91 may be removably mounted to the tool-mounting part 55 with the clamp shaft 6. In the present embodiment, a recess 550 which is recessed upward is formed in a lower end portion of the tool-mounting part 55. The recess 550 generally has a star shape centering on the driving axis A1 as viewed from below (see FIG. 5). As shown in FIG. 3, any of the tool accessories 91 (such as a blade, a scraper, a grinding pad and a polishing pad) which can be mounted to the oscillating tool 101 of the present embodiment has a protruding part 910 which has a shape substantially conforming to the recess 550 and can be fitted in the recess 550. The recess 550 and the protruding part 910 have inclined faces 551 and 911, respectively, which are inclined relative to the driving axis A1. When the protruding part 910 is fitted in the recess 550, the inclined faces 551 and 911 abut on each other and function as power transmission faces. In the present embodiment, the tool accessory 91 may be clamped by the tool-mounting part 55 and a clamp head 63 of the clamp shaft 6 and thereby fixed to the spindle 5 in a state in which the inclined faces 551 and 911 are in abutment with each other. Fixing and removing the tool accessory 91 to and from the spindle 5 will be described in detail below.

Figure 5:
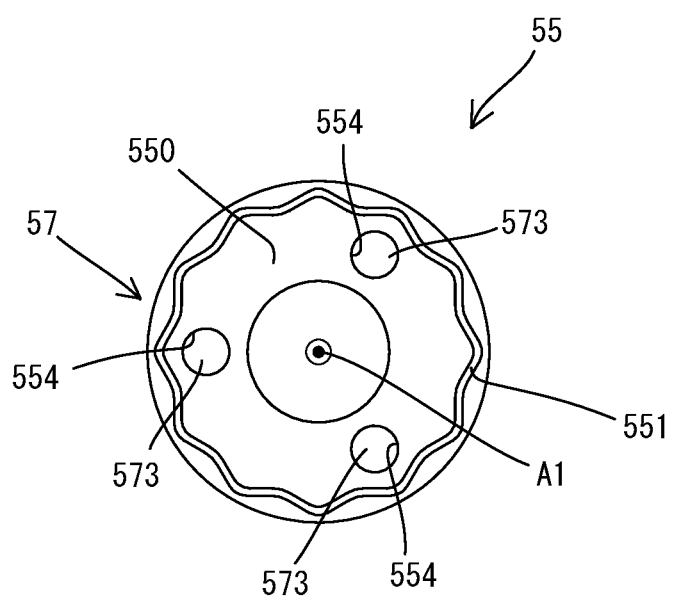
FIG. 5 is a bottom view of a tool-mounting part.
Figure 6:
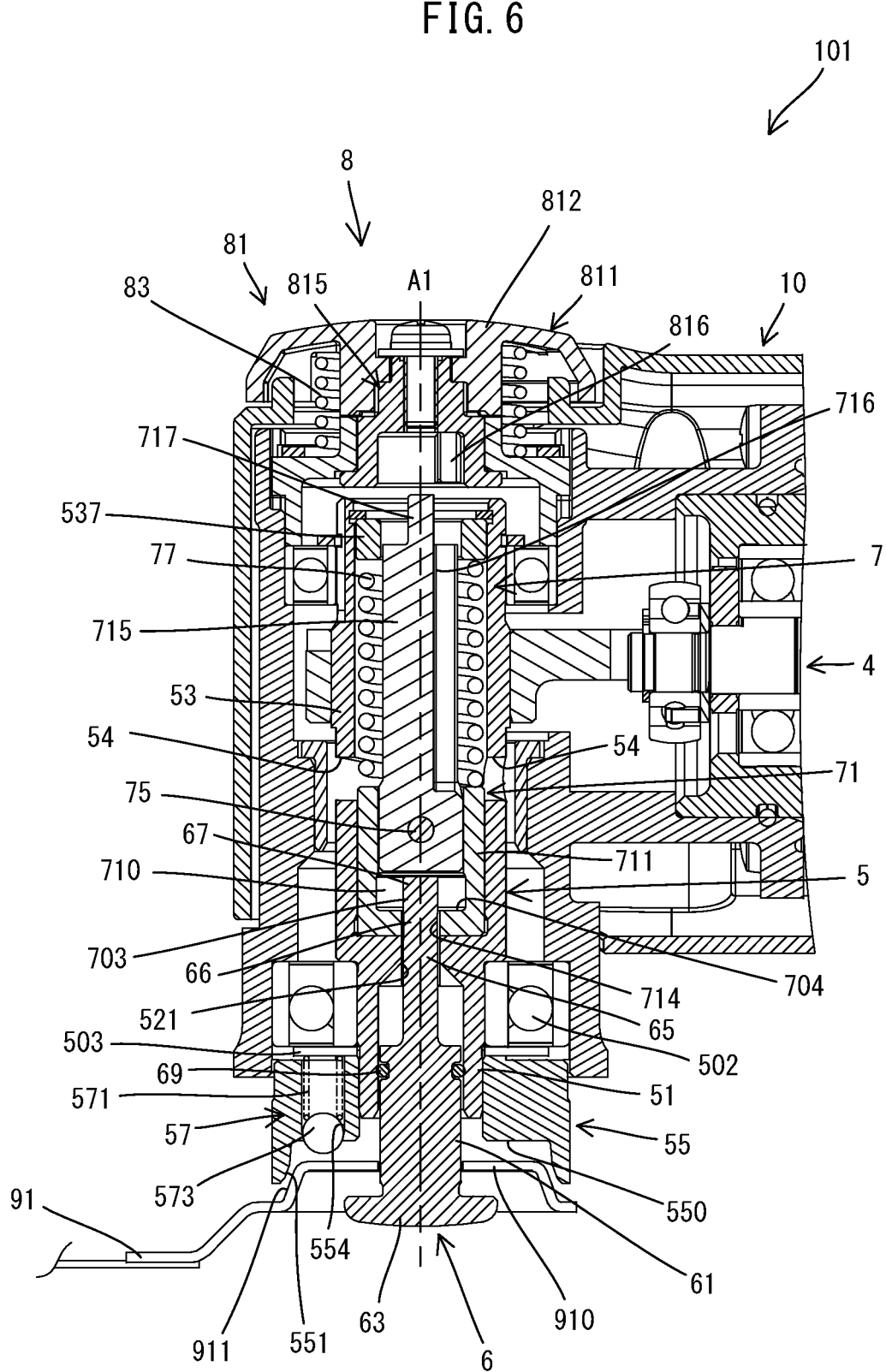
FIG. 6 is a partial sectional view corresponding to FIG. 3, showing the oscillating tool when the holding shaft is in an unclamp position.

As shown in FIGS. 3 and 5, the tool-mounting part 55 is provided with a biasing mechanism 57 for facilitating removal of the tool accessory 91. The biasing mechanism 57 includes biasing springs 571 and balls 573 which are respectively disposed within ball holding holes 554. The ball holding hole 554 is a through hole extending through the tool-mounting part 55 in the up-down direction. In the present embodiment, three ball holding holes 554 are provided at equal intervals in a circumferential direction around the driving axis A1. The biasing spring 571 and the ball 573 are disposed in each of the ball holding holes 554. Thus, the biasing mechanism 57 includes three sets of the biasing spring 571 and the ball 573. The biasing spring 571 is a compression coil spring and is arranged such that its axis extends in the up-down direction. The ball 573 is disposed under the biasing spring 571. The biasing spring 571 is held in a compressed state, with its upper and lower ends respectively abutted on the washer 503 and the ball 573, and always biases the ball 573 downward. As shown in FIG. 6, when the ball 573 is located in a lowest position within the ball holding hole 554, a portion of the ball 573 protrudes downward (toward the tool accessory 91) from a lower surface of the tool-mounting part 55 (a surface defining the top of the recess 550). Operation of the biasing mechanism 57 will be described in detail below.

Further, as shown in FIG. 3, a partition wall 52 is provided between the small-diameter part 51 and the large-diameter part 53 to demarcate these parts in the up-down direction. A positioning hole 521 extends through the partition wall 52 in the up-down direction in a central portion of the partition wall 52. The positioning hole 521 is configured as an elongate hole which is longer in the left-right direction, and front and rear ends of the positioning hole 521 are defined by a pair of flat faces parallel to each other.

The structure of the clamp shaft 6 is now described. The clamp shaft 6 of the present embodiment is configured as an elongate member which is configured to be removably mounted to the spindle 5. In the following description, directions of the clamp shaft 6 are described with reference to those of the clamp shaft 6 inserted into the spindle 5. As shown in FIGS. 3 and 4, the clamp shaft 6 of the present embodiment includes the shaft part 61, the clamp head 63, a positioning part 65, a neck part 66 and a locking part 67.

The shaft part 61 has a circular columnar shape. The shaft part 61 is a portion which may be inserted into the small-diameter part 51 of the spindle 5 coaxially with the spindle 5. An annular elastic member (a so-called O-ring) 69 is fitted in an annular groove formed in an outer periphery of an upper end portion of the shaft part 61. When the shaft part 61 is inserted into the small-diameter part 51, the elastic member 69 generates a frictional force by contact (comes in frictional contact) with an inner peripheral surface of the small-diameter part 51. With such a structure, the elastic member 69 can prevent the clamp shaft 6 from dropping by its own weight.

The clamp head 63 is a flange-like portion protruding radially outward from a lower end portion of the shaft part 61. The clamp head 63 is configured to clamp the tool accessory 91 in cooperation with the tool-mounting part 55 in a state in which the clamp head 63 is placed below the tool-mounting part 55.

The positioning part 65 is an elongate portion extending upward from the upper end of the shaft part 61 and coaxially with the shaft part 61. The positioning part 65 has a sectional shape which conforms to the positioning hole (elongate hole) 521 of the spindle 5. Specifically, an outer peripheral surface of the positioning part 65 includes a pair of flat faces 651 opposed in parallel to each other across an axis (the driving axis A1). The distance between the flat faces 651 is set to be slightly smaller than the width (the distance between a pair of flat faces defining front and rear ends) of the positioning hole 521. Further, the maximum diameter of the positioning part 65 is set to be substantially equal to the diameter of the shaft part 61 and to be slightly smaller than the maximum diameter of the positioning hole 521.

The neck part 66 extends upward from the positioning part 65 and coaxially with the shaft part 61. The neck part 66 has a circular columnar shape having a smaller diameter than the shaft part 61. The diameter of the neck part 66 is set to be substantially equal to the distance between the flat faces 651 of the positioning part 65 and to be slightly smaller than the width of the positioning hole 521.

The locking part 67 is formed contiguously to an upper end of the neck part 66 and has a generally rectangular block-like shape. The length of the locking part 67 in a direction orthogonal to the driving axis A1 is larger than the diameter of the neck part 66, and both ends of the locking part 67 protrude radially outward from the neck part 66. The locking part 67 has a shape substantially conforming to the positioning part 65 when viewed from above. Specifically, an outer peripheral surface (side surfaces) of the locking part 67 includes a pair of flat faces 671 opposed in parallel to each other across the axis (the driving axis A1). The distance between the flat faces 671 of the locking part 67 is set to be equal to the distance between the flat faces 651 of the positioning part 65 and to be slightly smaller than the width of the positioning hole 521. The maximum diameter of the locking part 67 is set to be substantially equal to the diameter of the shaft part 61 and to be slightly smaller than the maximum diameter of the positioning hole 521.

With such a structure, the positioning part 65 and the locking part 67 are allowed to pass through the positioning hole 521 only when located in a specific position relative to the spindle 5 in the circumferential direction around the driving axis A1. Further, although described in detail below, when the positioning part 65 is inserted into the positioning hole 521, the flat faces defining the front and rear ends of the positioning hole 521 face the flat faces 651 of the positioning part 65, so that the positioning part 65 of the clamp shaft 6 is prevented from rotating around the driving axis A1 (see FIG. 3). In other words, when the positioning part 65 is inserted into the positioning hole 521, the clamp shaft 6 is positioned and retained in the circumferential direction around the driving axis A1.

The structure of the holding mechanism 7 disposed within the large-diameter part 53 of the spindle 5 is now described. The holding mechanism 7 is configured to fixedly hold the clamp shaft 6 relative to the spindle 5 while biasing the clamp shaft 6 upward. As shown in FIGS. 3 and 4, the holding mechanism 7 of the present embodiment mainly includes a holding shaft 71, the engagement pin 75 and a biasing spring 77.

The holding shaft 71 is an elongate member extending in the up-down direction along the driving axis A1, and disposed coaxially with the spindle 5 within the large-diameter part 53 of the spindle 5. The holding shaft 71 is disposed to be movable in the up-down direction relative to the spindle 5 and rotatable around the driving axis A1. The holding shaft 71 includes a large-diameter part 711, a small-diameter part 715 and a lever-engagement part 717.

The large-diameter part 711 forms a lower end portion of the holding shaft 71. The large-diameter part 711 has an outer diameter which is generally equal to the inner diameter of the large-diameter part 53 of the spindle 5, and can slide along an inner peripheral surface of the large-diameter part 53. The small-diameter part 715 extends upward from the large-diameter part 711. The small-diameter part 715 has a smaller diameter than the large-diameter part 711. The lever-engagement part 717 has a rectangular section and protrudes upward from the small-diameter part 715 to form an upper end portion of the holding shaft 71. The small-diameter part 715 and the lever-engagement part 717 are formed as portions of a single base shaft 701. The large-diameter part 711 is formed by a bottomed circular cylindrical member 702 which is press-fitted onto a lower end portion of the base shaft 701. A bottom wall part (lower wall part) 703 of the cylindrical member 702 is spaced apart downward from a lower end of the base shaft 701, so that a space 710 is formed within a lower end portion of the holding shaft 71 (see FIG. 3). The existence of the space 710 allows the locking part 67 of the clamp shaft 6 to be inserted into the holding shaft 71 and to rotate around the driving axis A1 relative to the holding shaft 71.

Figure 7:
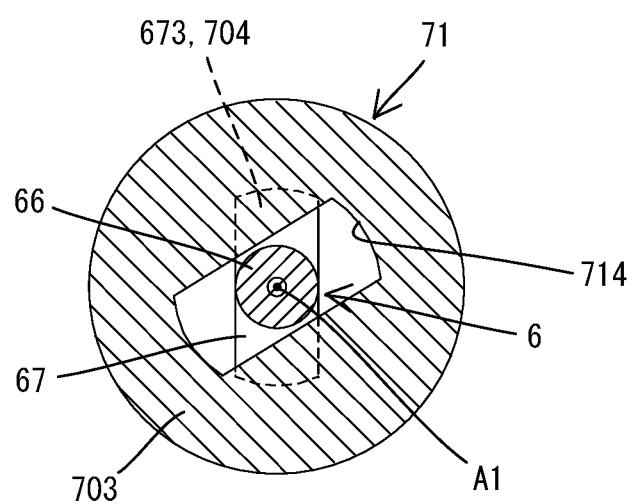
FIG. 7 is a sectional view taken along line VII-VII in FIG. 3, showing the clamp shaft and the holding shaft for illustrating a positional relationship between the clamp shaft and the holding shaft when a locking part is in a lock position.
Figure 8:
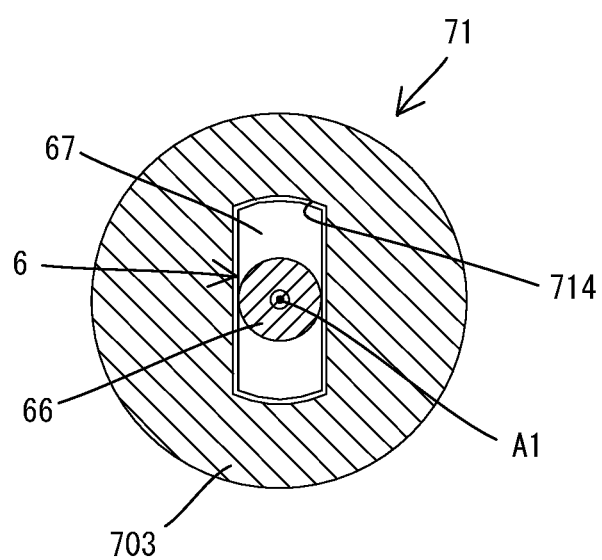
FIG. 8 is a sectional view corresponding to FIG. 7, for illustrating the positional relationship between the clamp shaft and the holding shaft when the locking part is in an unlock position.

Further, as shown in FIGS. 3 and 7, a locking hole 714 is formed in the bottom wall part 703. The locking hole 714 is a through hole extending through the bottom wall part 703 in the up-down direction and having a closed periphery. The locking hole 714 is configured as an elongate hole having substantially the same sectional shape as the positioning hole 521 of the spindle 5 which is described above. Specifically, the locking hole 714 is also configured to be slightly larger than the locking part 67 and to have a sectional shape conforming to the locking part 67. Therefore, as shown in FIG. 8, the locking part 67 is allowed to pass through the locking hole 714 in the up-down direction only when located in a specific position relative to the holding shaft 71 in the circumferential direction around the driving axis A1.

When the locking part 67 and the holding shaft 71 rotate relative to each other within a specific angle range after the locking part 67 is inserted into the space 710 through the locking hole 714, as shown in FIG. 7, the locking part 67 is not allowed to pass through the locking hole 714 and is engaged with the holding shaft 71. Specifically, portions of an upper surface 704 of the bottom wall part 703 (more specifically, a region of the upper surface 704 around the locking hole 714) is engaged in surface contact with a lower surface 673 of the locking part 67. In other words, the region of the upper surface 704 of the bottom wall part 703 around the locking hole 714 serves as an engagement face (receiving face). Thus, the clamp shaft 6 is connected to the holding shaft 71 by engagement between the locking part 67 and the holding shaft 71. Further, in terms of the relationship between the locking part 67 and the locking hole 714 of the present embodiment, the locking part 67 can be engaged with the holding shaft 71 if the rotation angle is larger than 0 degree and smaller than 180 degrees. For more reliable engagement, however, the rotation angle is preferably in a range from 15 to 90 degrees, and more preferably 30 to 90 degrees. In consideration of the balance between operation efficiency and reliable engagement of the locking part 67, the rotation angle is even more preferably in a range from about 30 to 60 degrees.

In the following description, as for the position of the clamp shaft 6 (the locking part 67) relative to the holding shaft 71 in the circumferential direction, a position (shown in FIG. 8) in which the locking part 67 is allowed to pass through the locking hole 714 is referred to as an unlock position, and a position (shown, for example, in FIG. 7) in which the locking part 67 is not allowed to pass through the locking hole 714 and is engaged with the holding shaft 71 is referred to as a lock position. In the present embodiment, the positional relationship between the holding shaft 71 and the clamp shaft 6 (the locking part 67) in the circumferential direction changes according to operation of a release lever 81 or insertion of the clamp shaft 6 into the holding shaft 71, which will be described in detail below.

Figure 9:
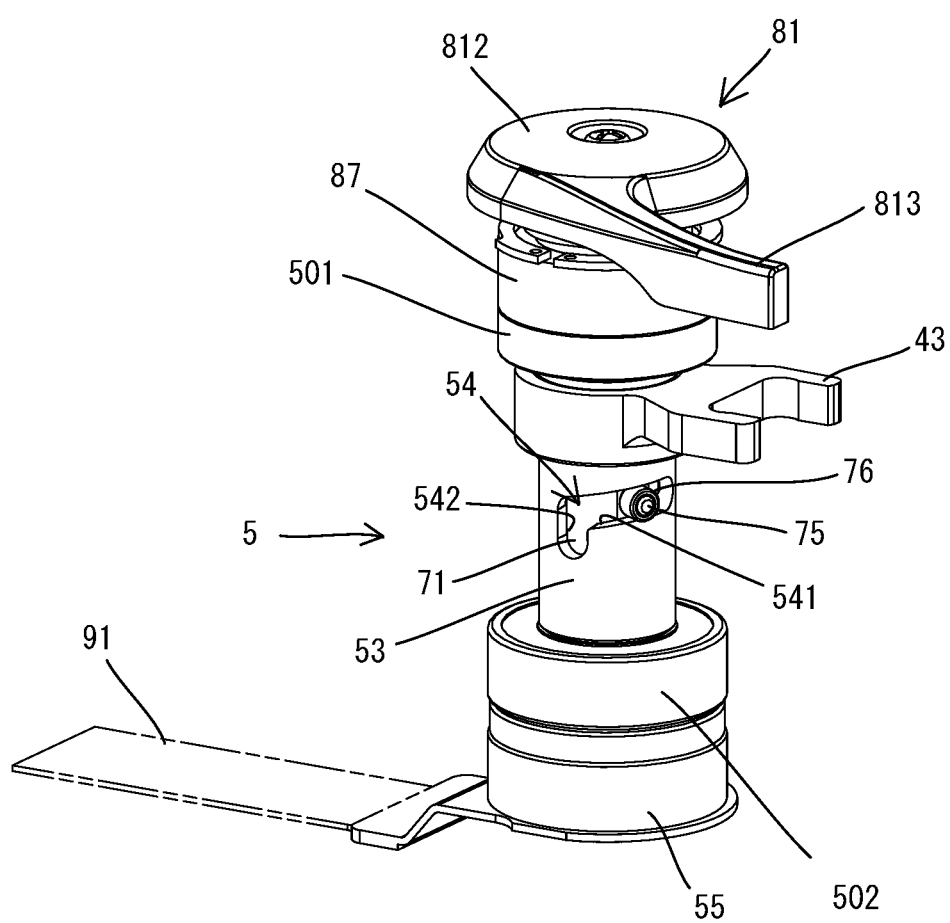
FIG. 9 is a perspective view showing the spindle, the holding shaft and a release lever when the holding shaft is in the clamp position.

As shown in FIG. 4, a through hole 713 is formed in the large-diameter part 711 (specifically, in its upper portion above the space 710) and extends through the large-diameter part 711 in a radial direction (a direction orthogonal to the driving axis A1). The engagement pin 75 is a circular columnar member having a small diameter, and is fitted into the through hole 713. The engagement pin 75 is longer than the outer diameter of the large-diameter part 711 and both end portions of the engagement pin 75 protrude from the large-diameter part 711 to the outside. Rollers 76 are rotatably supported on the end portions of the engagement pin 75. As shown in FIG. 9, the engagement pin 75 is engaged with the pin-engagement grooves 54 via the rollers 76.

In the present embodiment, a coil spring having both functions of a compression spring and a torsion spring is adopted as the biasing spring 77. As shown in FIGS. 3 and 4, the biasing spring 77 is mounted onto the small-diameter part 715 of the holding shaft 71 and extends in the up-down direction. A lower end portion (actuation end) of the biasing spring 77 is locked in a locking groove 716 (see FIG. 6) formed in the small-diameter part 715 of the holding shaft 71. An upper end portion (fixed end) of the biasing spring 77 is locked in a locking groove 531 (see FIG. 4) formed in the spindle 5. A circular cylindrical spring-receiving member 537 is disposed on the upper side of the biasing spring 77. Further, the spring-receiving member 537 is fitted in the large-diameter part 53. Upward movement of the spring-receiving member 537 is restricted by a retaining ring 539.

As shown in FIGS. 3 and 9, the holding mechanism 7 is assembled to the spindle 5 in a state in which the biasing spring 77 is compressed between an upper end of the large-diameter part 711 of the holding shaft 71 and a lower end of the spring-receiving member 537 and twisted in a clockwise direction when viewed from above (i.e. the biasing spring 77 is under load in the axial direction and the twisted direction). Thus, the holding shaft 71 is biased downward and in a counterclockwise direction when viewed from above. Further, the engagement pin 75 is engaged with the first parts 541 of the pin-engagement grooves 54 (specifically, with inclined faces each defining the first part 541) via the rollers 76 at a position where the axial force and the torsional force are balanced, so that the holding shaft 71 is prevented from moving in the axial direction and rotating around the driving axis A1 relative to the spindle 5. At this time, the holding shaft 71 is held while being biased upward by the torsional force of the biasing spring 77. In the following description, this position of the holding shaft 71 is referred to as a clamp position.

When the holding shaft 71 is located in the clamp position, the clamp shaft 6 connected to the holding shaft 71 via the locking part 67 is fixedly held (retained) relative to the spindle 5 while being biased upward, and the tool accessory 91 is clamped by the tool-mounting part 55 and the clamp head 63. When the holding shaft 71 is located in the clamp position, the locking part 67 is slightly separated downward from the lower end of the base shaft 701.

Further, as shown in FIG. 3, in the present embodiment, a releasing mechanism 8 is provided on the upper side of the spindle 5. The releasing mechanism 8 is configured to rotate the holding shaft 71 around the driving axis A1. The clamp shaft 6 is allowed to be removed from the holding shaft 71 when the holding shaft 71 is moved from the clamp position to the unclamp position by the releasing mechanism 8, which will be described in detail below.

The structure of the releasing mechanism 8 is now described. As shown in FIGS. 3 and 4, the releasing mechanism 8 of the present embodiment mainly includes the release lever 81 and a biasing spring 83.

The release lever 81 is supported by the housing 10 so as to be turned by a user. In the present embodiment, the release lever 81 is formed by an upper member 811 and a lower member 815. The upper member 811 is disposed on a top surface of the front end portion of the housing 10 and the lower member 815 is connected to the upper member 811 and protrudes downward. The upper member 811 includes a base part 812 having a circular shape as viewed from above and a lever part 813 protruding generally in a normal direction from the base part 812. The lower member 815 is configured as a stepped cylindrical member. A n upper portion of the lower member 815 is configured as a small-diameter part having a smaller outer diameter and fitted in a cylindrical hole formed in the base part 812. In the present embodiment, the upper member 811 and the lower member 815 are unrotatably fitted to each other with a cylindrical holding sleeve 87 fixed to the housing 10 being held therebetween in the up-down direction, and are fixed by a screw. With such a structure, the upper member 811 and the lower member 815 are integrated as the release lever 81 and supported rotatably around the driving axis A1 by the holding sleeve 87.

Figure 10:
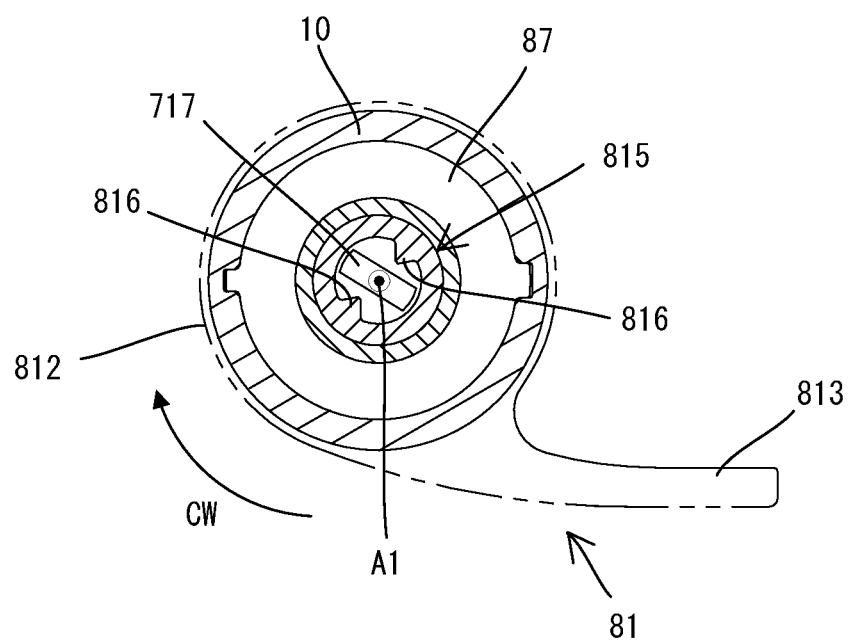
FIG. 10 is a sectional view taken along line X-X in FIG. 3, for illustrating a positional relationship between the release lever and the holding shaft when the release lever is in an initial position and the holding shaft is in the clamp position.

Further, as shown in FIG. 10, engagement parts 816 are formed on the inside of the lower member 815 at two positions in the circumferential direction around the driving axis A1. As shown in FIG. 3, when the holding shaft 71 is held in the clamp position, the lever-engagement part 717 protrudes upward from the spring-receiving member 537 and is located within the lower member 815. Each of the engagement parts 816 is configured as a protruding portion which can abut on a side surface of the lever-engagement part 717 of the holding shaft 71.

In the present embodiment, a torsion coil spring is adopted as the biasing spring 83. As shown in FIG. 3, the biasing spring 83 is mounted onto the holding sleeve 87 and a cylindrical portion of the base part 812. Although not shown in detail, a lower end portion (fixed end) of the biasing spring 83 is locked to the holding sleeve 87, while an upper end portion (actuation end) of the biasing spring 83 is locked to the base part 812. The biasing spring 83 is assembled to the release lever 81 while being twisted in a clockwise direction when viewed from above (i.e. the biasing spring 83 is under load in the twisted direction). Thus, the release lever 81 is biased in a counterclockwise direction when viewed from above and held in a position (see FIG. 1) where the lever part 813 extends rearward and abuts on a left side surface of the housing 10. This position of the release lever 81 is hereinafter referred to as an initial position.

Operations of the holding mechanism 7 and the releasing mechanism 8 when removing and mounting the tool accessory 91 are now described.

First, removal of the tool accessory 91 is described.

As shown in FIGS. 3, 7, 9 and 10, when the release lever 81 is located in the initial position and the holding shaft 71 is located in the clamp position, the lever-engagement part 717 of the holding shaft 71 is held in the inside of the lower member 815 of the release lever 81 without being pressed in the circumferential direction by the engagement parts 816. Further, as described above, both end portions (the rollers 76) of the engagement pin 75 are engaged with the respective first parts 541 of the pin-engagement grooves 54. Moreover, the locking part 67 is located in the lock position and is engaged with the bottom wall part 703, with the lower surface 673 being in surface contact with the upper surface 704, so that the clamp shaft 6 is connected to the holding shaft 71 via the locking part 67. Thus, the clamp shaft 6 is fixedly held relative to the spindle 5 while being biased upward, and the tool accessory 91 is clamped by the tool-mounting part 55 and the clamp head 63.

At this time, the balls 573 of the biasing mechanism 57 are biased downward by the respective biasing springs 571 and press the tool accessory 91 in abutment with an upper surface of the protruding part 910 of the tool accessory 91. Meanwhile, the biasing spring 77 biases the clamp shaft 61 upward via the holding shaft 71 and thereby applies a clamping force of clamping the tool accessory 91 between the tool-mounting part 55 and the clamp head 63. This clamping force is larger than the downward biasing force applied by the biasing springs 571. Therefore, the tool accessory 91 is clamped between the tool-mounting part 55 and the clamp head 63 so as to immovable in the up-down direction in spite of being biased downward by the biasing springs 571. Thus, the tool accessory 91 can be firmly clamped by the tool-mounting part 55 and the clamp head 63 and retained without coming off, due to the biasing force of the biasing springs 571, from the tool-mounting part 55.

In this state, a user holds the lever part 813 and turns the release lever 81 from the initial position in a clockwise direction (shown by arrow CW in FIG. 10) against the biasing force of the biasing spring 83. In this process, the engagement parts 816 abut on the lever-engagement part 717 and rotates the holding shaft 71 in the same direction as the release lever 81 (clockwise direction when viewed from above) against the biasing force of the biasing spring 77. The engagement pin 75 engaged with the first parts 541 of the pin-engagement grooves 54 moves obliquely downward within the first parts 541 along with rotation of the holding shaft 71. At this time, the rollers 76 roll within the respective first parts 541, so that the engagement pin 75 is guided along the first parts 541. Thus, the holding shaft 71 moves downward while rotating around the driving axis A1 relative to the spindle 5. A torsional force (torque) is applied to the biasing springs 83 and 77 along with rotation of the release lever 81 and the holding shaft 71.

Figure 11:
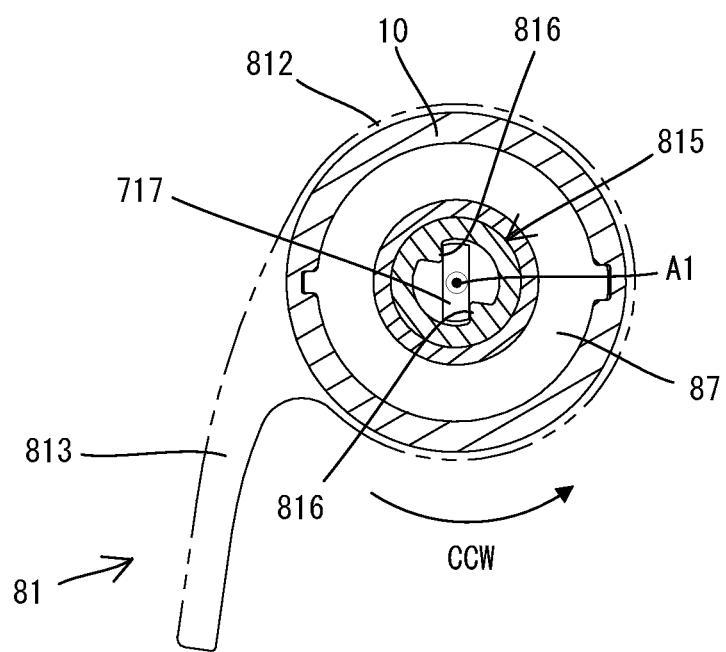
FIG. 11 is a sectional view corresponding to FIG. 10, for illustrating the positional relationship between the release lever and the holding shaft when the release lever is turned to a turned position and the holding shaft is located in the unclamp position.

As shown in FIG. 11, when the release lever 81 is turned to an approximately 90 degrees position (hereinafter referred to as a turned position) from the initial position in the clockwise direction, each of the end portions (the rollers 76) of the engagement pin 75 reaches a portion connecting from the first part 541, which obliquely extends, to the second part 542, which extends in the up-down direction. At this time, the holding shaft 71 is biased downward by a restoring force of the biasing spring 77, which has been pre-compressed in the axial direction. The engagement pin 75 is engaged with the second parts 542 via the rollers 76, and guided downward along the second parts 542. It is noted here that the holding shaft 71 is also biased in the counterclockwise direction when viewed from above by the restoring force of the biasing spring 77 in the torsional direction, but prevented from rotating by engagement of the engagement pin 75 with the second parts 542 via the rollers 76. Therefore, the holding shaft 71 lineally moves downward. A long with the downward movement of the holding shaft 71, clamping of the tool accessory 91 by the tool-mounting part 55 and the clamp head 63 is released.

Figure 12:
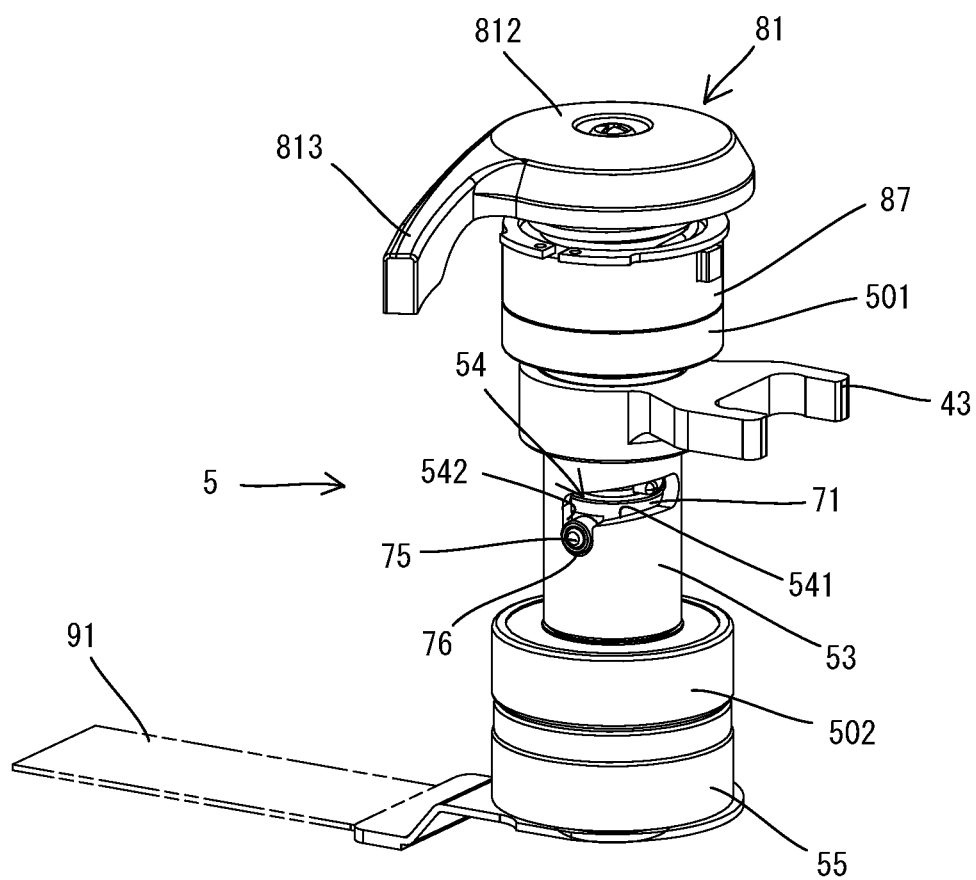
FIG. 12 is a perspective view showing the spindle, the holding shaft and the release lever when the holding shaft is in the unclamp position.

A s shown in FIG. 12, the holding shaft 71 moves to a position where the engagement pin 75 abuts on a lower ends of the second parts 542, and is held in this position by the biasing force of the biasing spring 77 in the axial direction. This position of the holding shaft 71 is hereinafter referred to as an unclamp position. A s shown in FIG. 6, in the unclamp position, the lever-engagement part 717 of the holding shaft 71 is separated downward from the engagement parts 816 of the release lever 81.

When the release lever 81 is turned, the holding shaft 71 rotates around the driving axis A1 relative to the spindle 5, but the clamp shaft 6 is held in a non-rotatable manner relative to the spindle 5. Therefore, the position of the clamp shaft 6 in the circumferential direction relative to the holding shaft 71 changes. In the present embodiment, the rotation angle (which takes a plus value in clockwise rotation) of the release lever 81 from the initial position to the turned position is approximately 90 degrees, while the rotation angle of the holding shaft 71 from the clamp position to the unclamp position, that is, the rotation angle of the locking part 67 from the unlock position to the lock position, is set to be within a range of about 30 to 60 degrees.

When the holding shaft 71 is rotated from the clamp position to the unclamp position, the clamp shaft 6 relatively moves from the lock position shown in FIG. 7 to the unlock position shown in FIG. 8 where the locking part 67 is allowed to pass through the locking hole 714 of the holding shaft 71. Thus, the clamp shaft 6 is disengaged from the holding shaft 71 and allowed to move downward. At this time, the locking hole 714 and the positioning hole 521 of the spindle 5 are aligned with each other in the up-down direction. Therefore, the clamp shaft 6 is allowed to be removed (pulled out) from the holding shaft 71 and the spindle 5.

In the process in which the holding shaft 71 is moved from the clamp position to the unclamp position as the release lever 81 is turned, the lower end of the base shaft 701 abuts on an upper end of the locking part 67 and pushes the clamp shaft 6 downward. The clamp shaft 6 linearly moves downward without rotating since it is prevented from rotating as described above. At this time, the clamp shaft 6 slides within the small-diameter part 51 while being prevented from dropping by its own weight due to the frictional force of the elastic member 69 fitted onto the outer periphery of the shaft part 61. Even when the holding shaft 71 reaches the unclamp position, as shown in FIG. 6, the clamp shaft 6 is held inserted in the small-diameter part 51. In this state, the user can remove the tool accessory 91 by pulling the clamp shaft 6 out of the spindle 5 and the holding shaft 71 together with the tool accessory 91.

In the process in which the holding shaft 71 and the clamp shaft 6 move downward while the upward biasing force of the biasing spring 77 is released, the balls 573 which are biased downward by the respective biasing springs 571 press the tool accessory 91 from above. When the tool accessory 91 is driven in the oscillating manner while the tool accessory 91 is pressed against the tool-mounting part 55 from below by the clamp head 63 with the inclined face 911 in abutment with the inclined face 551, the tool accessory 91 may stick to the tool-mounting part 55 with the protruding part 910 fitted into the recess 550. In such a case, if the tool accessory 91 relatively loosely sticks to the tool-mounting part 55, the biasing mechanism 57 can push out the protruding part 910 from the recess 550. Even if the tool accessory 91 relatively firmly sticks to the tool-mounting part 55, the biasing mechanism 57 can press the tool accessory 91 downward, so that the user can hold and more easily remove the tool accessory 91. Thus, the biasing mechanism 57 can at least ease the sticking of the tool accessory 91.

Figure 13:
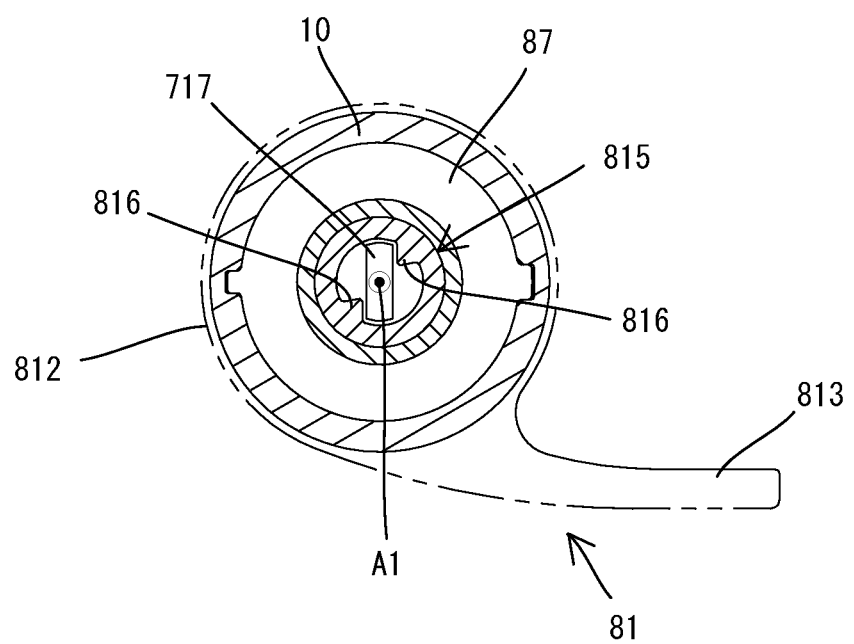
FIG. 13 is a sectional view corresponding to FIG. 10, for illustrating the positional relationship between the release lever and the holding shaft when the release lever is returned to the initial position while the holding shaft is located in the unclamp position.

When the user releases the lever part 813 while the holding shaft 71 is located in the unclamp position, the release lever 81 turns toward the initial position in the counterclockwise direction (shown by arrow CCW in FIG. 11) by a restoring force corresponding to the torsional force which has been applied to the biasing spring 83 by the release lever 81 being turned to the turned position. At this time, as described above, the lever-engagement part 717 of the holding shaft 71 is separated downward from the engagement parts 816 of the release lever 81 (see FIG. 6). Further, the holding shaft 71 is prevented from rotating by engagement of the end portions (the rollers 76) of the engagement pin 75 with the second parts 542 of the pin-engagement grooves 54. Therefore, as shown in FIG. 13, even if the release lever 81 returns to the initial position, the holding shaft 71 is held in the unclamp position without rotating. As a result, the user can easily remove the clamp shaft 6 and the tool accessory 91 after releasing the release lever 81.

Next, mounting of the tool accessory 91 is described.

As described above, when a user mounts the tool accessory 91, the holding shaft 71 is held in the unclamp position by the biasing force of the biasing spring 77 in the axial direction, and the clamp shaft 6 has been removed. The user first selects the tool accessory 91 for a desired operation and inserts the clamp shaft 6 through the through hole formed in the central portion of the protruding part 910 of the tool accessory 91. Then, the user adjusts the position of the clamp shaft 6 in the circumferential direction relative to the spindle 5 and the holding shaft 71 and inserts the clamp shaft 6 into the spindle 5 and the holding shaft 71 from the locking part 67 side. Specifically, the user positions the clamp shaft 6 such that the locking part 67 and the positioning part 65 are allowed to pass through the positioning hole 521 of the spindle 5 and the locking part 67 is allowed to pass through the locking hole 714 of the holding shaft 71. In the unclamp position, as described above, the holding shaft 71 is held in a non-rotatable manner relative to the spindle 5, and the positioning hole 521 and the locking hole 714 are aligned with each other in the up-down direction. Therefore, the positioning in this case means placing the locking part 67 in the unlock position in the circumferential direction.

When the clamp shaft 6 is placed in the unlock position and moved upward relative to the spindle 5 and the holding shaft 71, as shown in FIG. 6, the locking part 67 is inserted into the space 710 of the lower end portion of the holding shaft 71 through the locking hole 714. Then, the upper end of the locking part 67 abuts on the lower end of the base shaft 701 and pushes the holding shaft 71 upward against the axial biasing force of the biasing spring 77. The engagement pin 75 (see FIG. 12), which is engaged with the second parts 542 via the rollers 76, moves upward within the second parts 542 toward the portions connecting to the respective first parts 541.

When the engagement pin 75 reaches the portions each connecting from the second part 542 to the first part 541, the holding shaft 71 rotates relative to the spindle 5 in the counterclockwise direction when viewed from above, by the restoring force corresponding to the torsional force which has been applied to the biasing spring 77 by the release lever 81 being turned to the turned position. At this time, the engagement pin 75 moves obliquely upward within the first parts 541. Then, the engagement pin 75 (the rollers 76) is engaged with the first parts 541 (the inclined faces) at the position where the torsional force and the axial force are balanced, and the holding shaft 71 is returned to the clamp position and held in this position.

Meanwhile, the clamp shaft 6 is prevented from rotating relative to the spindle 5 since the positioning part 65 is disposed within the positioning hole 521. Therefore, when the holding shaft 71 rotates around the driving axis A1 relative to the spindle 5, the position of the locking part 67 in the circumferential direction relative to the holding shaft 71 changes from the unlock position (see FIG. 8) to the lock position (see FIG. 7). As a result, the locking part 67 is engaged with the holding shaft 71 and thus the clamp shaft 6 is connected to the holding shaft 71. Therefore, when the holding shaft 71 returns to the clamp position, the clamp shaft 6 is fixedly held relative to the spindle 5 while being biased upward, so that the tool accessory 91 is clamped by the tool-mounting part 55 and the clamp head 63. In the process in which the clamp shaft 6 and the tool accessory 91 move upward, the balls 573 located in the respective lowest positions are pushed upward against the biasing force of the biasing springs 571 in abutment with the upper surface of the protruding part 910 of the tool accessory 91. The balls 573 are then held in a state of pressing the tool accessory 91 from above, as described above (see FIG. 3).

As described above, in the oscillating tool 101 of the present embodiment, the tool accessory 91 is clamped with the inclined face 911 pressed against the inclined face 551 of the tool-mounting part 55. In such a state, when the tool accessory 91 is driven in an oscillating manner, the tool accessory 91 may stick to the tool-mounting part 55. In the present embodiment, however, the biasing mechanism 57 provided in the tool-mounting part 55 can at least ease the sticking of the tool accessory 91 to the tool-mounting part 55, so that the tool accessory 91 can be easily removed.

Particularly, in the present embodiment, the biasing mechanism 57 includes three biasing springs 571 which are arranged at equal intervals in the circumferential direction around the driving axis A1. Therefore, the biasing mechanism 57 can bias the tool accessory 91 in a well-balanced manner around the driving axis A1 and thus can more reliably eliminate or ease sticking of the tool accessory 91 to the tool-mounting part 55. Further, each of the biasing springs 571 is a compression coil spring and biases the tool accessory 91 downward via the ball 573 which is disposed under the biasing spring 571 so as to be movable in the up-down direction. Therefore, durability of the biasing spring 571 can be enhanced compared with a structure in which the biasing spring 571 biases the tool accessory 91 in abutment with the tool accessory 91.

Further, in the present embodiment, the oscillating tool 101 includes the holding shaft 71 which is movable in the up-down direction between the clamp position and the unclamp position relative to the spindle 5. The holding shaft 71 is held by the biasing force of the biasing spring 77 both in the clamp position and in the unclamp position. In other words, even if pressing of the release lever 81 is released, the holding shaft 71 does not automatically return to the clamp position. Further, inserting the shaft part 61 into the spindle 5 when the holding shaft 71 is in the unclamp position causes the holding shaft 71 to move to the clamp position. Therefore, by simply inserting the shaft part 61 into the spindle 5 (that is, by one-touch operation), the user can cause the holding shaft 71 to move to the clamp position and thus fixedly hold the clamp shaft 6 relative to the spindle 5. Further, the biasing springs 571 of the biasing mechanism 57 can be further compressed to bias the tool accessory 91 downward simply by the above-described one-touch operation of mounting the tool accessory 91 by the user.

Second Embodiment

A n oscillating tool 102 according to a second embodiment is now described with reference to FIGS. 14 to 18. Most of the structures or components of the oscillating tool 102 of the present embodiment are substantially identical to those of the oscillating tool 101 (see FIGS. 1 to 4), except that the structure of a tool-mounting part 56 is different. Therefore, in the following description, structures or components identical to those of the first embodiment are given the same reference numerals as in the first embodiment, and their description and drawings are appropriately omitted or simplified, and the structure and operation of the tool-mounting part 56 are mainly described.

Figure 14:
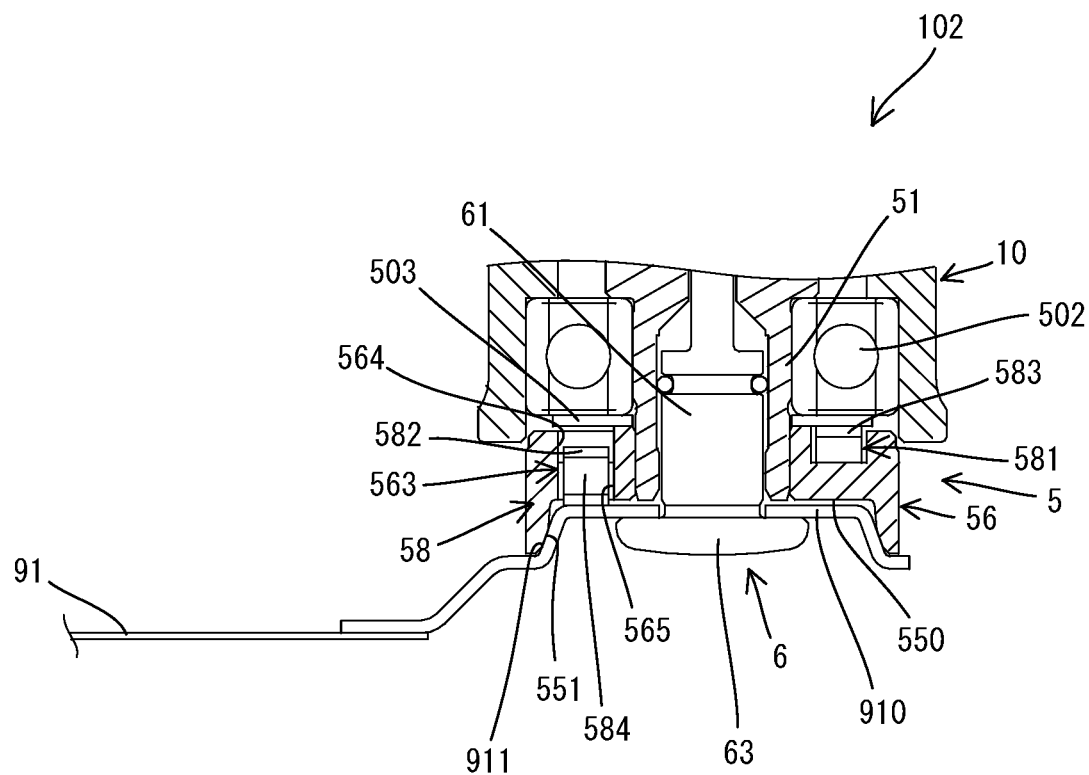
FIG. 14 is a partial sectional view showing an oscillating tool when the holding shaft is in the clamp position.
Figure 15:
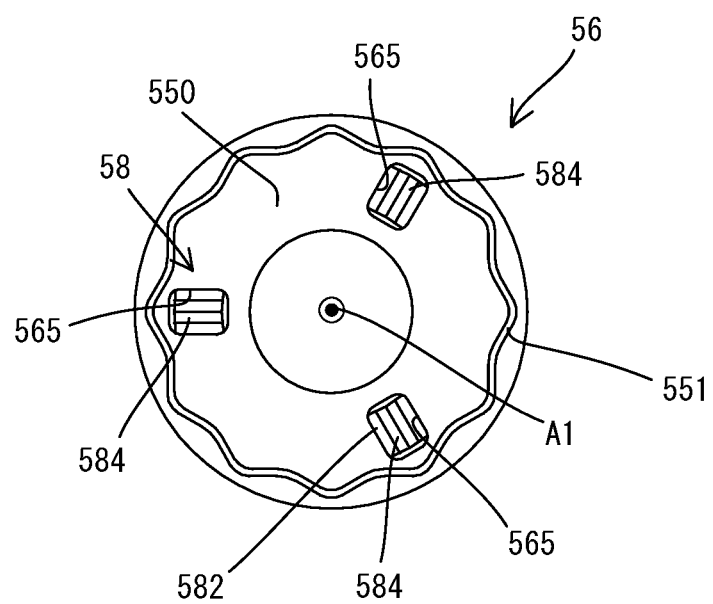
FIG. 15 is a bottom view of a tool-mounting part.
Figure 16:
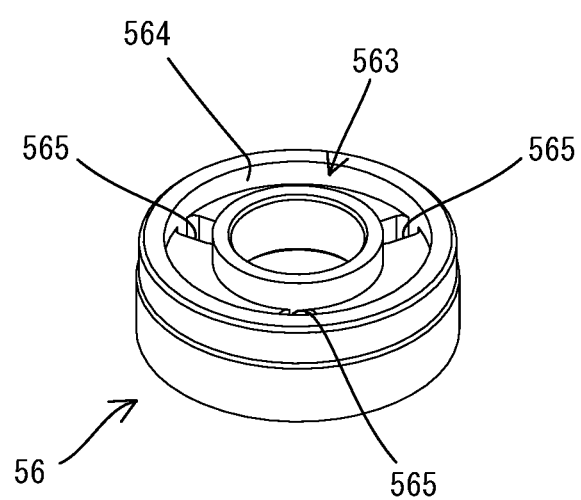
FIG. 16 is a perspective view of the tool-mounting part.
Figure 17:
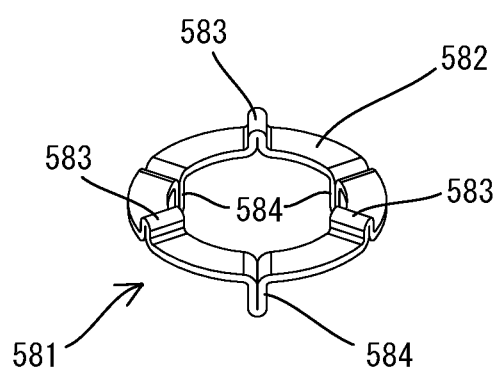
FIG. 17 is a perspective view of a biasing spring.

As shown in FIG. 14, like the tool-mounting part 55 (see FIG. 3) of the first embodiment, the tool-mounting part 56 is a flange-like portion and is disposed below the bearing 502 with the washer 503 interposed therebetween, and press-fitted onto the outer periphery of the small-diameter part 51. The recess 550 is formed in a lower end portion of the tool-mounting part 56 such that the protruding part 910 of the tool accessory 91 can be fitted therein. The tool accessory 91 is clamped by the tool-mounting part 56 and the clamp head 63 of the clamp shaft 6 with the inclined faces 551 and 911 in abutment with each other and is thus fixed to the spindle 5.

Further, as shown in FIGS. 14 to 17, the tool-mounting part 56 is provided with a biasing mechanism 58 for facilitating removal of the tool accessory 91. In the present embodiment, the biasing mechanism 58 includes a biasing spring 581 disposed within a spring-housing part 563 of the tool-mounting part 56. The spring-housing part 563 includes an annular recess 564 recessed downward from an upper surface of the tool-mounting part 56 and three through holes 565 extending through the tool-mounting part 56 from a bottom of the recess 564 to a lower surface of the tool-mounting part 56 (the surface defining the top of the recess 550) in the up-down direction. The through holes 565 are arranged at equal intervals in the circumferential direction. In the present embodiment, the biasing spring 581 as a whole is an annular flat spring (a spring made from a flat sheet-like metal). The biasing spring 581 includes an annular base part 582, three protrusions 583, and three protrusions 584. The base part 582 is fitted in the recess 564. The protrusions 583 are formed by bending and protrudes upward from the base part 582. The protrusions 584 are formed by bending and protrude downward from the base part 582. The protrusions 583 are arranged at equal intervals in the circumferential direction, and the protrusions 584 are also arranged at equal intervals in the circumferential direction. Further, each of the protrusions 584 is arranged in the middle between two adjacent protrusions 583. In other words, the protrusions 583 and 584 are alternately disposed at equal intervals in the circumferential direction. The biasing spring 581 is configured to be elastically deformed in the up-down direction as the base part 582 is deflected.

Figure 18:
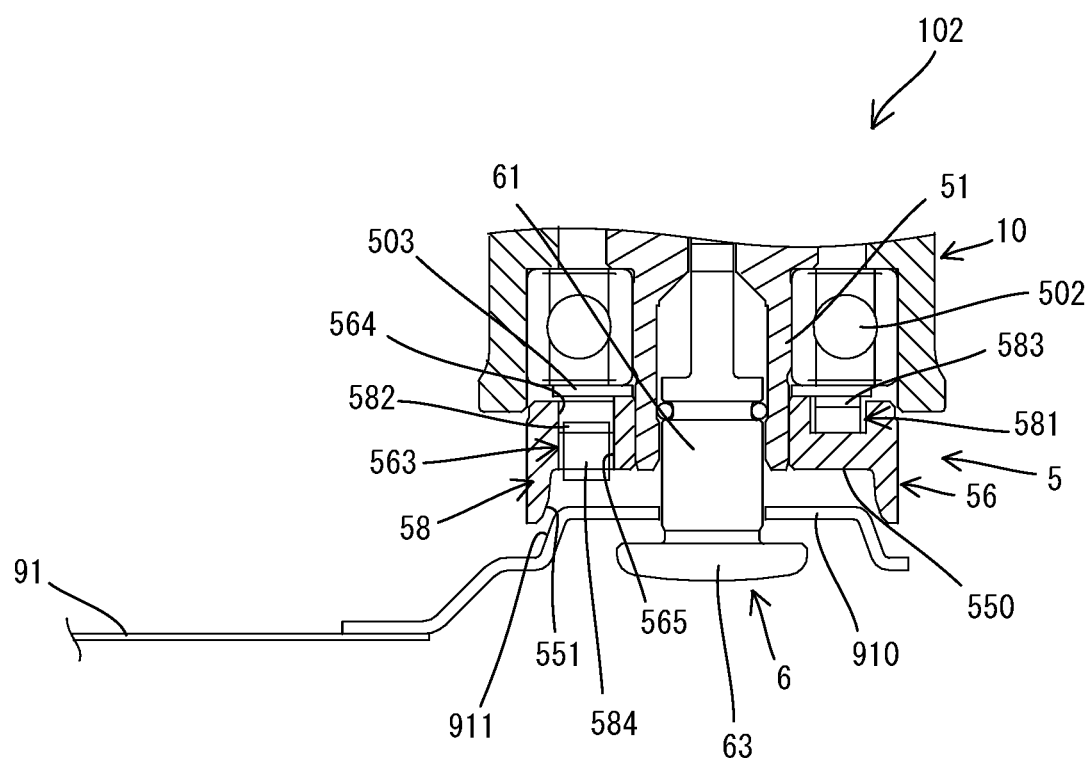
FIG. 18 is a partial sectional view corresponding to FIG. 14, showing the oscillating tool when the holding shaft is in the unclamp position.

The biasing spring 581 is housed in the spring-housing part 563 with upper ends of the protrusions 583 abutted on the washer 503 and with the protrusions 584 arranged in the respective through holes 565. Further, as shown in FIG. 18, when an upward external force is not applied to the biasing spring 581, a lower surface of the base part 582 abuts on the bottom of the recess 564 and the protrusions 584 are located in their lowest positions in the respective through holes 565. At this time, a lower end portions of the protrusions 584 protrude downward (toward the tool accessory 91) from the lower surface of the tool-mounting part 56 (the top surface of the recess 550).

Like the biasing mechanism 57 of the first embodiment, the biasing mechanism 58 of the present embodiment can facilitate removal of the tool accessory 91. Specifically, as shown in FIG. 14, when the tool accessory 91 is clamped by the tool-mounting part 56 and the clamp head 63, the base part 582 is deflected upward and the protrusions 584 bias the tool accessory 91 downward in abutment with the upper surface of the protruding part 910 of the tool accessory 91. Like in the first embodiment, the clamping force applied by the biasing spring 77 is larger than the downward biasing force applied by the biasing spring 581. Therefore, the tool accessory 91 is clamped between the tool-mounting part 56 and the clamp head 63 so as to be immovable in the up-down direction, in spite of being biased downward by the biasing spring 581. Thus, the tool accessory 91 can be firmly clamped by the tool-mounting part 56 and the clamp head 63 and retained without coming off, due to the biasing force of the biasing spring 581, from the tool-mounting part 56.

In removal of the tool accessory 91, in the process in which the holding shaft 71 and the clamp shaft 6 move downward while the upward biasing force of the biasing spring 77 is released, the protrusions 584 press the tool accessory 91 from above by a restoring force of the biasing spring 581. Therefore, even when the tool accessory 91 sticks to the tool-mounting part 56, with the protruding part 910 fitted in the recess 550, if the tool accessory 91 relatively loosely sticks to the tool-mounting part 56, the biasing mechanism 58 (the biasing spring 581) can push out the protruding part 910 from the recess 550. Further, even if the tool accessory 91 relatively firmly sticks to the tool-mounting part 56, the biasing mechanism 58 can press the tool accessory 91 downward, so that a user can hold and easily remove the tool accessory 91. Thus, like the biasing mechanism 57, the biasing mechanism 58 can also at least ease the sticking of the tool accessory 91.

In the present embodiment, the biasing mechanism 58 includes the three protrusions 584 which are arranged at equal intervals in the circumferential direction around the driving axis A1. Therefore, the biasing mechanism 58 can bias the tool accessory 91 in a well-balanced manner around the driving axis A1 and thus can more reliably eliminate or ease sticking of the tool accessory 91 to the tool-mounting part 56. Further, in the present embodiment, each of the protrusions 584 is a portion of the biasing spring 581, which is a flat spring. Thus, the single flat spring can realize a simple structure for biasing the tool accessory 91 downward at plural positions.

When mounting the tool accessory 91, in the process in which the clamp shaft 6 and the tool accessory 91 move upward, the protrusions 584 located in the lowest positions are pushed upward against the biasing force of the biasing spring 581 in abutment with the upper surface of the protruding part 910 of the tool accessory 91. Accordingly, the base part 582 is deflected upward. When the tool accessory 91 is clamped, the protrusions 584 are held in a state of pressing the tool accessory 91 from above. Thus, like in the first embodiment, the biasing spring 581 of the biasing mechanism 58 can be elastically deformed to bias the tool accessory 91 downward, simply by the one-touch operation of mounting the tool accessory 91 by the user.

Correspondences between the features of the embodiments and the features of the claimed invention are as follows. It is noted, however, that the features of the above-described embodiment are mere examples which are non-limiting. Each of the oscillating tools 101 and 102 is an example of the 'work tool_. The driving axis A1 is an example of the 'driving axis_. The spindle 5 is an example of the 'spindle_. Each of the tool-mounting parts 55 and 56 is an example of the 'lower end portion of the spindle_. The inclined face 551 is an example of the 'first inclined face_. The tool accessory 91 and the inclined face 911 are examples of the 'tool accessory_ and the 'second inclined face, respectively. The clamp shaft 6 is an example of the 'clamp shaft_. The shaft part 61 is an example of the 'shaft part_. The clamp head 63 is an example of the 'head part_. The biasing spring 571 is an example of the 'biasing part_ and the 'compression coil spring_. The ball 573 is an example of the' ball_. The ball holding hole 554 is an example of the 'recess_. The biasing spring 581 is an example of the 'flat spring_. The protrusion 584 is an example of the 'biasing part_ and the 'protrusion_. The base part 582, the recess 564 and the through hole 565 are examples of the 'base part_, the 'annular recess_ and the 'through hole_, respectively. The biasing spring 77 is an example of the 'biasing member_. The holding shaft 71 is an example of the 'holding member_. The clamp position and the unclamp position of the holding shaft 71 are examples of the 'holding position_ and the 'release position_, respectively. The release lever 81 is an example of the 'operation member_. The pin-engagement groove 54 (specifically, the first part 541) is an example of the 'inclined groove_ The engagement pin 75 is an example of the 'protrusion_. The second part 542 of the pin-engagement groove 54 is an example of the 'vertical groove_.

The above-described embodiments are mere examples and a work tool according to the present invention is not limited to the oscillating tools 101 and 102 of the above-described embodiments. For example, the following modifications may be made. Further, one or more of these modifications may be used in combination with any one of the oscillating tools 101 and 102 of the above-described embodiments or the claimed invention.

The structures of the biasing mechanisms 57 and 58 may be appropriately changed as long as they are configured to always bias the tool accessory 91 downward while the tool accessory 91 is clamped by the tool-mounting part 56 and the clamp head 63. For example, the above-described embodiments describe the three biasing parts (the biasing springs 571, the protrusions 584) which are arranged at three positions at equal intervals in the circumferential direction to bias the tool accessory 91 downward. Each of the biasing mechanisms 57 and 58, however, may have only one biasing part, or may have two or four or more biasing parts. Further, in place of the compression coil spring or the flat spring of the above-described embodiments, a spring of a different type (such as a disc spring and a torsion spring) may be adopted.

Further, the structures (for example, components, shapes, arrangements and support structures) of the spindle 5, the clamp shaft 6, the holding mechanism 7 and the releasing mechanism 8 may be appropriately changed or modified. Examples of adoptable modifications are as follows.

For example, in the above-described embodiments, the holding mechanism 7 is configured to fixedly hold the clamp shaft 6 relative to the spindle 5 and clamp the tool accessory 91 by only the operation of inserting the shaft part 61 into the spindle 5 (i.e. by one-touch operation). A holding mechanism having such a one-touch function is not limited to the holding mechanism 7. For example, the structures of the locking part 67 of the clamp shaft 6 and the locking hole 714 may be appropriately changed. Further, for example, the holding mechanism 7 may be configured such that a groove formed in the clamp shaft 6 and at least one ball held by the holding shaft 71 are engaged with each other by the operation of inserting the shaft part 61 into the spindle 5.

The holding mechanism 7 need not necessarily have the one-touch function and may be configured to clamp and unclamp the tool accessory 91 according to an external operation of an operation member, such as the release lever 81. For example, a holding mechanism may be adopted which has at least one ball, or at least one clamp member having a plurality of teeth, which is configured to be moved in the radial direction of the spindle 5 according to the operation of the operation member. In this case, the clamp shaft 6 need not necessarily be held via a separate member such as the holding shaft 71, and may be directly held by the at least one ball or the at least one clamp member. Further, in the above-described embodiments, the clamp shaft 6 is biased upward relative to the spindle 5 by the biasing spring 77 so that the tool accessory 91 is clamped. In place of this structure, the tool accessory 91 may be clamped, for example, by the clamp shaft 6 being fixed to the spindle 5 using a screw. The structure of the spindle 5 may be appropriately changed according to the structures of the clamp shaft 6 and the holding mechanism 7.

The release lever 81 may be configured to turn not around the driving axis A1 but around a pivot axis extending in a direction (for example, the left-right direction) orthogonal to the driving axis A1.

The structures of the housing 10, the motor 3 and the driving mechanism 4 may also be appropriately changed. For example, the housing 10 may be a vibration-isolating housing including an inner housing which houses the motor 3, the driving mechanism 4 and the spindle 5, and an outer housing which is elastically connected to the inner housing. The motor 3 may be a brushless motor. The motor 3 may be housed within a front end portion of the housing 10 such that the rotation axis of the motor shaft 31 extends in parallel to the driving axis A1. Further, for example, the oscillating tools 101 and 102 may be configured to be operated by power supplied not from the battery 93 but from an external alternate current (AC) power source.

DESCRIPTION OF THE NUMERALS

101, 102: oscillating tool, 10: housing, 13: grip part, 15: switch, 17: battery-mounting part, 3: motor, 31: motor shaft, 4: driving mechanism, 41: eccentric shaft, 411: eccentric part, 43: oscillating arm, 45: drive bearing, 5: spindle, 501: bearing, 502: bearing, 503: washer, 51: small-diameter part, 52: partition wall, 521: positioning hole, 53: large-diameter part, 531: locking groove, 537: spring-receiving member, 539: retaining ring, 54: pin-engagement groove, 541: first part, 542: second part, 55: tool-mounting part, 550: recess, 551: inclined face, 554: ball holding hole, 56: tool-mounting part, 563: spring-housing part, 564: recess, 565: through hole, 57: biasing mechanism, 571: biasing spring, 573: ball, 58: biasing mechanism, 581: biasing spring, 582: base part, 583: protrusion, 584: protrusion, 6: clamp shaft, 61: shaft part, 63: clamp head, 65: positioning part, 66: neck part, 651: flat face, 67: locking part, 671: flat face, 673: lower surface, 69: elastic member, 7: holding mechanism, 71: holding shaft, 701: base shaft, 702: cylindrical member, 703: bottom wall part, 704: upper surface, 710: space, 711: large-diameter part, 713: through hole, 714: locking hole, 715: small-diameter part, 716: locking groove, 717: lever-engagement part, 75: engagement pin, 76: roller, 77: biasing spring, 8: releasing mechanism, 81: release lever, 811: upper member, 812: base part, 813: lever part, 815: lower member, 816: engagement part, 83: biasing spring, 87: holding sleeve, 91: tool accessory, 910: protruding part, 911: inclined face, 93: battery, A1: driving axis

What is claimed is:

1. A work tool configured to perform a processing operation on a workpiece by driving a tool accessory in an oscillating manner, the work tool comprising:
    a spindle configured to be reciprocally rotated within a specified angle range around a driving axis, the driving axis defining an up-down direction of the work tool, the spindle having a first inclined face on a lower end portion of the spindle that is inclined in a direction crossing the driving axis at an acute angle with the driving axis;
    a clamp shaft including a shaft part and a head part, the shaft part being configured to be coaxially inserted into the spindle, the head part being on a lower end portion of the shaft part when the shaft part is inserted into the spindle; and
    at least one biasing part in the spindle; wherein:
    the head part of the clamp shaft, the tool accessory and the spindle are configured such that the head part clamps the tool accessory to the spindle when the shaft part is inserted into the spindle by directly pressing together a second inclined face of the tool accessory and the first inclined face;
    the second inclined face is inclined in the direction crossing the driving axis; and
    the at least one biasing part is configured to always bias the tool accessory downward away from the spindle while the tool accessory is clamped by the head part and the spindle.

2. The work tool as defined in claim 1, wherein the at least one biasing part is at least one spring.

3. The work tool as defined in claim 1, wherein the at least one biasing part includes a plurality of biasing parts spaced apart in a circumferential direction around the driving axis.

4. The work tool as defined in claim 3, wherein the plurality of biasing parts are three biasing parts at equal intervals in the circumferential direction.

5. The work tool as defined in claim 3, further comprising:
    a flat spring that is elastically deformable in the up-down direction, wherein:
    the flat spring has a plurality of protrusions protruding downward, and
    the plurality of biasing parts are the plurality of protrusions of the flat spring.

6. The work tool as defined in claim 5, wherein
    the flat spring includes an annular base part and the plurality of protrusions protrude downward from the base part,
    the lower end portion of the spindle has an annular recess and a plurality of through holes each having an open bottom, the base part is in the recess when the plurality of protrusions are in the plurality of through holes, and when the plurality of protrusions are in lowest positions, the plurality of protrusions protrude downward from a lower surface of the spindle.

7. The work tool as defined in claim 1, further comprising:
at least one ball under the at least one biasing part that is movable in the up-down direction, wherein:
the at least one biasing part is at least one compression coil spring and is configured to bias the tool accessory downward via the at least one ball.

8. The work tool as defined in claim 7, wherein
the lower end portion of the spindle has at least one recess extending in the up-down direction,
the at least one biasing part and the at least one ball are in the at least one recess, and
when the at least one ball is in a lowest position, the at least one ball protrudes from a lower surface of the spindle.

9. The work tool as defined in claim 1, further comprising:
a biasing member configured to apply a clamping force to the tool accessory, to clamp the tool accessory between the head part and the spindle, by biasing the clamp shaft, wherein:
the tool accessory is clamped between the head part and the spindle by the clamping force so as to be immovable in the up-down direction; and
the biasing member is configured such that the clamping force is larger than a downward biasing force of the at least one biasing part.

10. The work tool as defined in claim 9, further comprising:
a holding member that is movable between a holding position and a release position in the up-down direction relative to the spindle, the holding member in the holding position fixedly holding the clamp shaft relative to the spindle, the holding member in the release position allowing the clamp shaft to be removed from the spindle, wherein:
the holding member is configured to be held in the holding position and the release position by a biasing force of the biasing member, and to move to the holding position when the shaft part is inserted into the spindle while the holding member is in the release position.

11. The work tool as defined in claim 10, further comprising:
an operation member configured to be externally operated by a user, wherein:
the holding member is configured to be moved from the holding position to the release position according to an operation of the operation member.

12. The work tool as defined in claim 10, wherein:
the biasing member is a coil spring having both functions of a compression coil spring and a torsion spring, and
the biasing member is configured to bias the holding member downward relative to the spindle by a restoring force corresponding to compression of the biasing member when the holding member is in the release position, and to bias the holding member upward relative to the spindle by a restoring force corresponding to torsion of the biasing member when the holding member is in the holding position.

13. The work tool as defined in claim 10, wherein:
the spindle has an inclined groove in an outer periphery of the spindle, the inclined groove being inclined relative to the driving axis, the holding member has a protrusion in the inclined groove, and
the biasing member is configured to rotate and bias the holding member around the driving axis so as to engage the protrusion with the inclined groove, thereby holding the holding member in the holding position.

14. The work tool as defined in claim 13, wherein:
the spindle has a vertical groove contiguously to a lower end of the inclined groove and extending downward, and
the biasing member is configured to bias the holding member downward relative to the spindle so as to engage the protrusion with a lower end of the vertical groove, thereby holding the holding member in the release position.

15. The work tool as defined in claim 14, wherein the protrusion is configured to abut on an end of the vertical groove in a circumferential direction when the holding member is in the release position, thereby preventing the holding member from rotating relative to the spindle.

16. The work tool as defined in claim 1, further comprising:
a plurality of balls, wherein:
the at least one biasing part includes a plurality of compression coil springs at equal intervals in a circumferential direction around the driving axis,
the plurality of balls are under the plurality of compression coil springs so as to be movable in the up-down direction, and
the plurality of compression coil springs are configured to bias the tool accessory downward via the plurality of balls.

17. The work tool as defined in claim 16, further comprising:
a biasing member configured to apply a clamping force to the tool accessory, to clamp the tool accessory between the head part and the spindle, by biasing the clamp shaft, wherein:
the tool accessory is clamped between the head part and the spindle by the clamping force so as to be immovable in the up-down direction, and
the biasing member is configured such that the clamping force is larger than a downward biasing force of the plurality of compression coil springs.

18. The work tool as defined in claim 1, further comprising:
a flat spring that is elastically deformable in the up-down direction, wherein:
the flat spring has a plurality of protrusions arranged at equal intervals in a circumferential direction around the driving axis and protruding downward, and
the at least one biasing part includes the plurality of protrusions of the flat spring.

19. The work tool as defined in claim 18, further comprising:
a biasing member configured to apply a clamping force to the tool accessory, to clamp the tool accessory between the head part and the spindle, by biasing the clamp shaft, wherein:
the tool accessory is clamped between the head part and the spindle by the clamping force so as to be immovable in the up-down direction; and
the biasing member is configured such that the clamping force is larger than a downward biasing force of the plurality of protrusions of the flat spring.

20. The work tool as defined in claim 1, wherein the first inclined face and the second inclined face are between (1) a surface of the tool accessory that is in contact with the head part and (2) a lowermost surface of the tool accessory in the up-down direction when the tool accessory is clamped between the spindle and the head portion.

* * * * *